S. CHESTER.
Telegraph Line.
No. 63,613.
3 Sheets—Sheet 2.
Patented April 9, 1867.
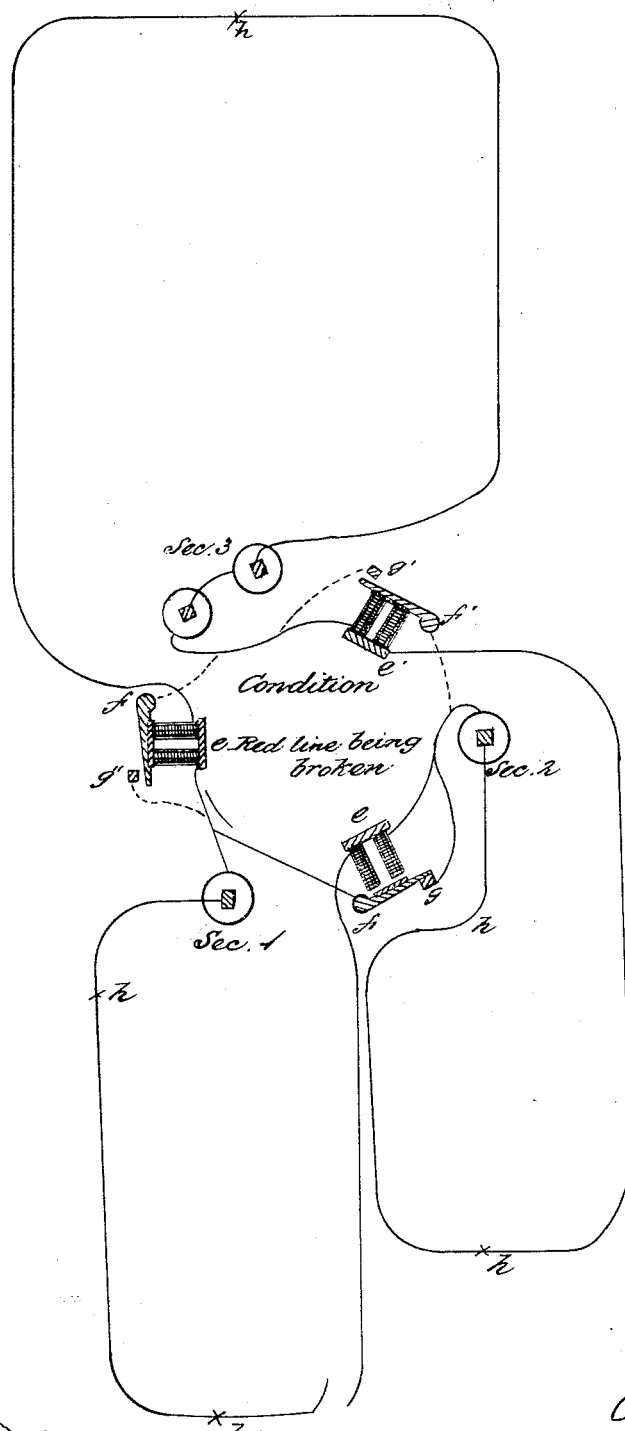
Witnesses:
Inventor:
Stephen Chester S. CHESTER.
Telegraph Line.
No. 63,613.
3 Sheets—Sheet 3.
Patented April 9, 1867.
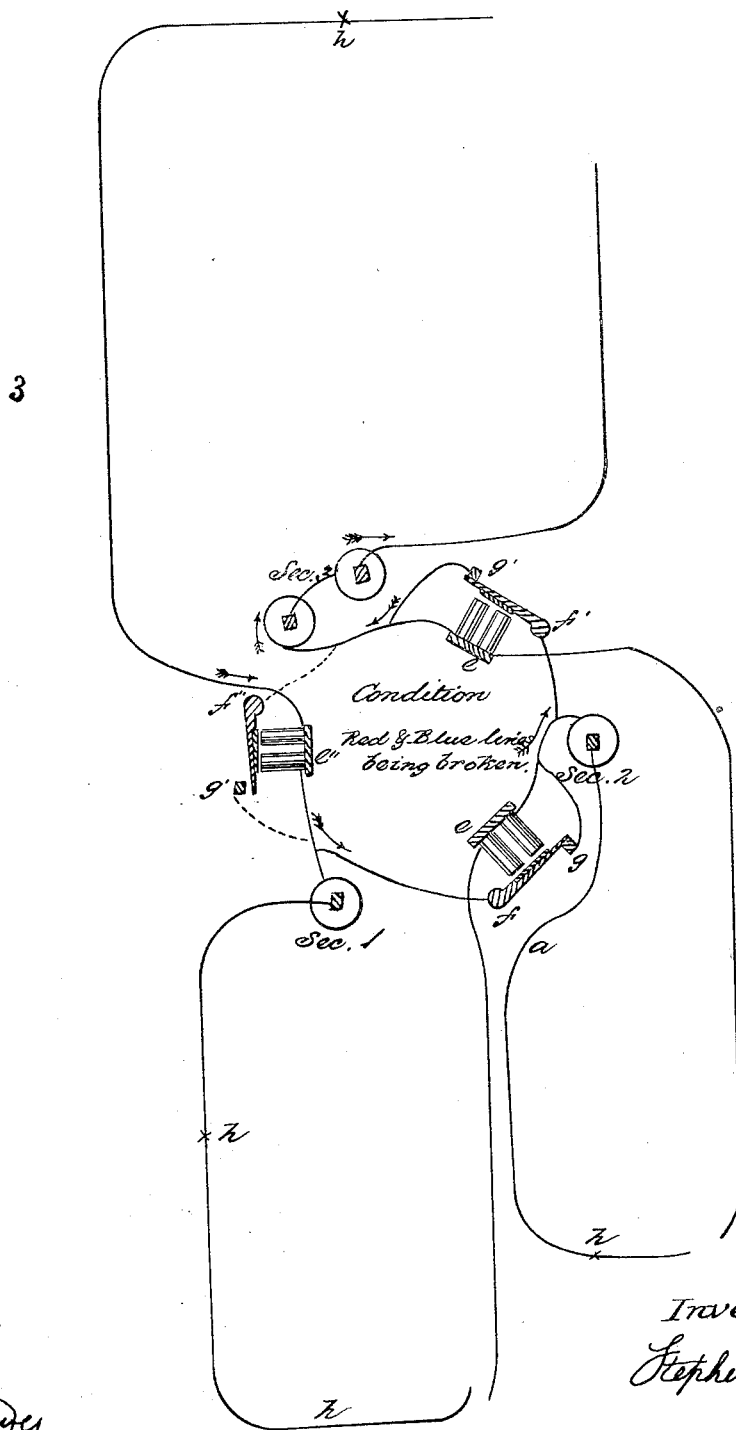
Witnesses:
Inventor:
Stephen Chester

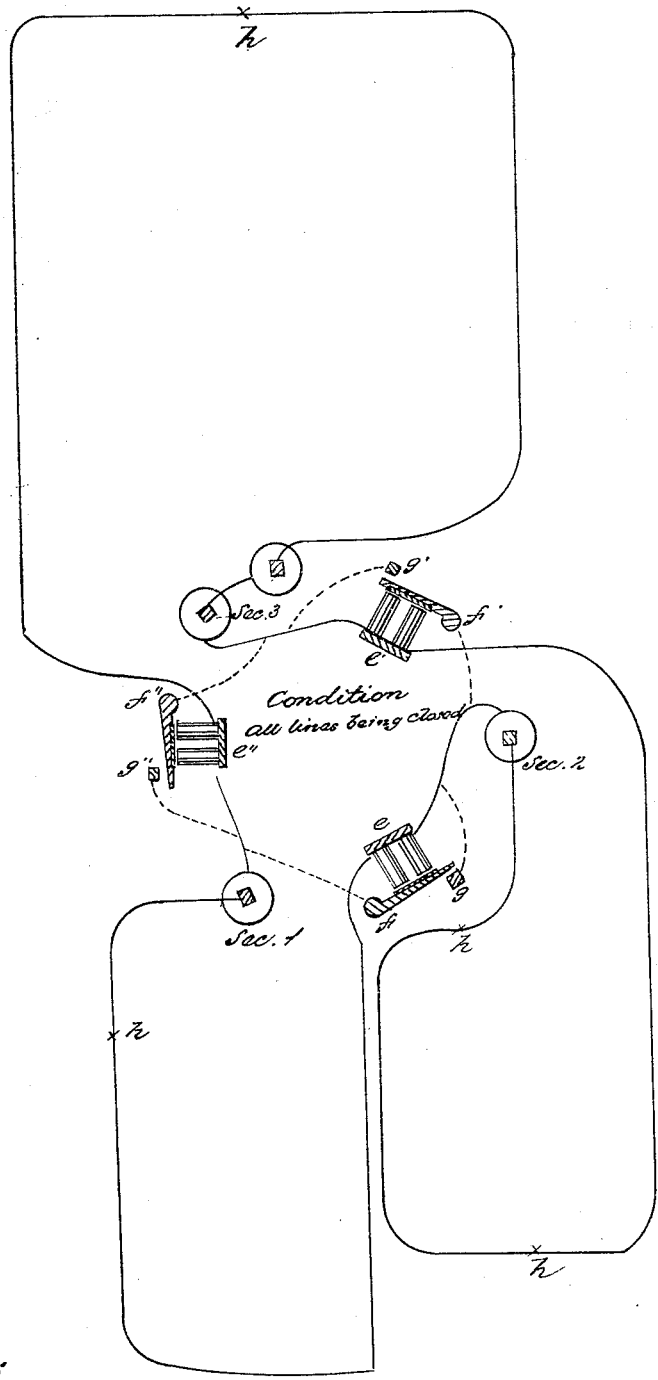

United States Patent Office.

STEPHEN CHESTER, OF NEW YORK, N. Y.

Letters Patent No. 63,613, dated April 9, 1867.

---

IMPROVEMENT IN CONNECTING TELEGRAPH STATIONS.

---

The Schedule referred to in these Letters Patent and making part of the same.

---

TO ALL WHOM IT MAY CONCERN:

Be it known that I, STEPHEN CHESTER, of the city, county, and State of New York, have invented a new and useful Method of Combining Several Lines of Telegraph in such manner that signals may be communicated from any point on any one of those lines or circuits through each and all the other lines or circuits as upon one line, whilst if any one of these circuits is broken at any point, continuity will be established between all the remaining circuits, and their susceptibility to receive and communicate signals will be unimpaired; and I do hereby declare that the following is a full and exact description thereof, reference being had to the accompanying drawings, and the letters of reference marked thereon.

The nature of my invention consists in bringing both ends of each and every of several circuits or lines to one common centre, where the batteries may be placed, and then so uniting these ends in connection with the battery or sections thereof, that they may thus connected form one continuous line. Supplementary wires, in combination with magnets and apparatus hereafter described, are attached, that may connect the ends of alternate lines. On the accompanying drawing three such lines or circuits are represented, colored respectively red, blue, and black, the ends of which enter the room or enclosure represented near the centre of drawings. The battery is divided into as many sections as there may be lines or circuits, each section consisting of as many cups as the length and condition of its respective line may require. As three circuits are represented on the accompanying drawing, the battery is divided into three sections, 1, 2, 3.

Commencing with one of these lines, as, for instance, the red line, one end (which for convenience of description may be called the "outgoing" end) is connected with one or the other end of its section of battery, (for instance, the zinc pole,) and the other end ("incoming") is connected with one end of the coil of an electro-magnet, $e$, the other end of which connects with the opposite or copper end of the next succeeding section (No. 2) of battery. The "outgoing" end of the next (blue) line leaving the zinc pole of this same section of battery, its incoming end passing through another similar electro-magnet, $e'$, connects with the copper pole of section No. 3 of battery. The third or black line leaving the zinc pole of the same section of battery No. 3, its incoming end passing through another similar electro-magnet, $e''$, connects with the copper end of the first section of battery. Hence the several lines are connected continuously through all the batteries and magnets as one line through one battery, and any signal communicated to any part of any one of these lines is receivable from all parts of all the other lines. Attached to each of the above-described magnets, $e\ e'\ e''$, are armature bars, $f\ f'\ f''$, to be moved by the magnet when the line is unbroken, and an anvil, block, or point, $g\ g'\ g''$, against which the armature bar recoils by means of a spring or other device, when, on account of the continuity of the line being broken, the magnet loses its attractive force. Supplementary wires or connections connect the armature bars $f\ f'\ f''$ to one pole of the next succeeding section of battery respectively, and other supplementary wires connect the several anvils, blocks, or points to the magnet of the next succeeding line, at the end which approaches the battery. Hence, in the normal condition of these lines, continuity being established, as above described, between all the lines, the armatures of the several magnets $e\ e'\ e''$, as well as those of any other magnets, $h\ h\ h\ h$, which may be placed in any part of any of the lines, will be drawn to the faces of their respective magnets. Now, if continuity is broken at any point of any lines thus connected, all the armature bars will recoil from the faces of their respective magnets throughout the entire series of lines, and the armature bars $f\ f'\ f''$ will come in contact with the points $g\ g'\ g''$, when a new connection through the supplementary wires before described, between the respective ends of the lines on either side of that on which continuity is broken, and all the armatures on all the lines, excepting said broken line, will approach their respective magnets, and thus remain until continuity is again broken at some point on this newly formed circuit. Should continuity remain broken upon a second line, the same operation will similarly connect all remaining lines so long as the integrity of any is unimpaired. When continuity is again established on the above-mentioned line or lines, the magnets of those lines will again perform their functions, and the armature bars $f$, $f'$, or $f''$, as the case may be, will resume their former positions, and the former connections of the lines will be re-established, but without disturbing the condition of the magnets on other lines by so doing. When it is desired that a longer interval shall occur between the breaking of one circuit and the formation of a new one, as above described, than occurs in the passage of the armature bar from the face of the magnet to the block $g$, $g'$, or $g''$, the connection may be formed by a pendulum, clock-work, or other device, controlled by the above-described magnet.

What I claim as my invention, and desire to secure by Letters Patent, is—

1. The arrangement of several telegraph lines, each in connection with magnets and batteries, and converging to a common centre, by which the several lines and several batteries may be united as one line and one battery, or as distinct lines and distinct batteries, or combinations thereof, by the operation of any one or more of said lines, without the presence of any one to control or direct the movements at the common centre, substantially as described.

2. The application of such connectors, that when one or more of several lines forming one line or circuit has been "cut out" of the general circuit by reason of breaks existing, and a new circuit, embracing the remaining lines, has been formed, that said broken lines being restored to continuity in themselves will instantly resume their normal position in the general circuit, without disturbing the normal condition of the remainder of the lines, and without the presence of any one at the point where the several lines are connected together to direct or control the movements.

STEPHEN CHESTER.

Witnesses:
EDWARD F. BROWN,
J. N. CHESTER.